United States Patent
Habibi et al.

(10) Patent No.: US 11,680,212 B2
(45) Date of Patent: Jun. 20, 2023

(54) ENGINEERED FEED PROCESS IN CATALYTIC CRACKING, SIMULTANEUS RADICALIZATION OF HYDROGEN GAS AIDED BY ELECTROMAGNETIC WAVES TO CONVERT NATURAL AND SYNTHETIC HYDROCARBON WASTE INTO GASOLINE AND GAS OIL

(71) Applicants: Seyed Ramin Habibi, Tustin, CA (US); Sayedmahdi Azizzavie, Tustin, CA (US); Mohammad Shahbazi, Tustin, CA (US); Farhad Pour Mohamad Sakha, Tustin, CA (US); Saeid Shahsavari, Tustin, CA (US); Davoud Shahsavari, Tustin, CA (US)

(72) Inventors: Seyed Ramin Habibi, Tustin, CA (US); Sayedmahdi Azizzavie, Tustin, CA (US); Mohammad Shahbazi, Tustin, CA (US); Farhad Pour Mohamad Sakha, Tustin, CA (US); Saeid Shahsavari, Tustin, CA (US); Davoud Shahsavari, Tustin, CA (US)

(*) Notice: Subject to any disclaimer, the term of this patent is extended or adjusted under 35 U.S.C. 154(b) by 0 days.

(21) Appl. No.: 17/512,262

(22) Filed: Oct. 27, 2021

(65) Prior Publication Data
US 2023/0126518 A1 Apr. 27, 2023

(51) Int. Cl.
C10G 47/22 (2006.01)
C01B 3/06 (2006.01)
B01J 19/12 (2006.01)

(52) U.S. Cl.
CPC .......... *C10G 47/22* (2013.01); *C01B 3/06* (2013.01); *B01J 19/126* (2013.01);
(Continued)

(58) Field of Classification Search
CPC ......... C10B 53/02; C10B 39/02; C10B 57/10; C10B 39/00; C10B 41/00; C10B 43/02;
(Continued)

(56) References Cited

PUBLICATIONS

Hayashi et al. "The role of microwave irradiation in coal desulphurization with molten caustics", Fuel, 1990, vol. 69, June p. 739-743 (Year: 1990).*

(Continued)

*Primary Examiner* — Steven J Bos
*Assistant Examiner* — Syed T Iqbal

(57) ABSTRACT

A method and process of producing gasoline and diesel from hydrocarbon wastes, by gradually heating the hydrocarbon waste in a reducing atmosphere, up to 550° C. During the heating process and at various temperature points long chains of hydrocarbon are broken down into smaller hydrocarbon chains. During the heating process radical hydrogen gas is introduced to the reactor where the radical hydrogen gas reacts with smaller hydrocarbon chains to produce 45% coke petroleum oil, 45% liquid hydrocarbons composed of gasoline and gasoil and 10% gases including methane, ethane, propane and steam. The radicalized hydrogen atoms are produced at low temperatures and atmospheric pressure. Hydrogen gas is produced by dissolving aluminum scraps are dissolved in a sodium hydroxide solution in a reactor. As hydrogen gas is produced the reactor is heated to 120° C. in the presence of electromagnetic waves causing the breakdown of hydrogen gas into hydrogen gas radicals.

3 Claims, 2 Drawing Sheets

(52) U.S. Cl.
CPC .... *C01B 2203/0272* (2013.01); *C01B 2203/063* (2013.01); *C10G 2300/1007* (2013.01); *C10G 2400/02* (2013.01); *C10G 2400/04* (2013.01)

(58) Field of Classification Search
CPC ......... C10B 45/00; C10B 47/30; C10B 49/02; C10B 57/005; C10B 57/02; C10B 57/06
See application file for complete search history.

(56) References Cited

PUBLICATIONS

Streicher "The Dissolution of Aluminum in Sodium Hydroxide Solutions. II" 1949 J. Electrochem. Soc. 96 170 (Year: 1949).*

* cited by examiner

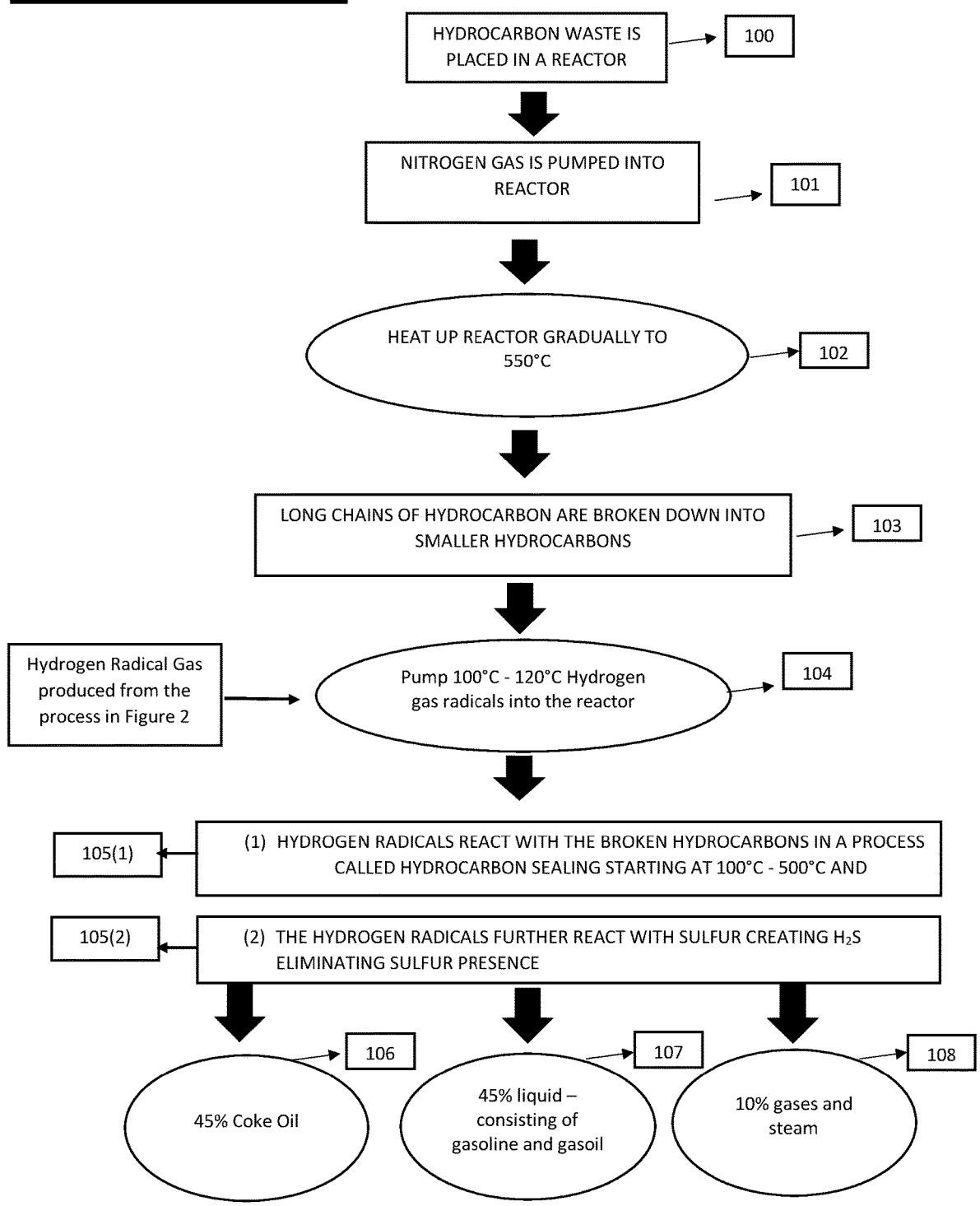

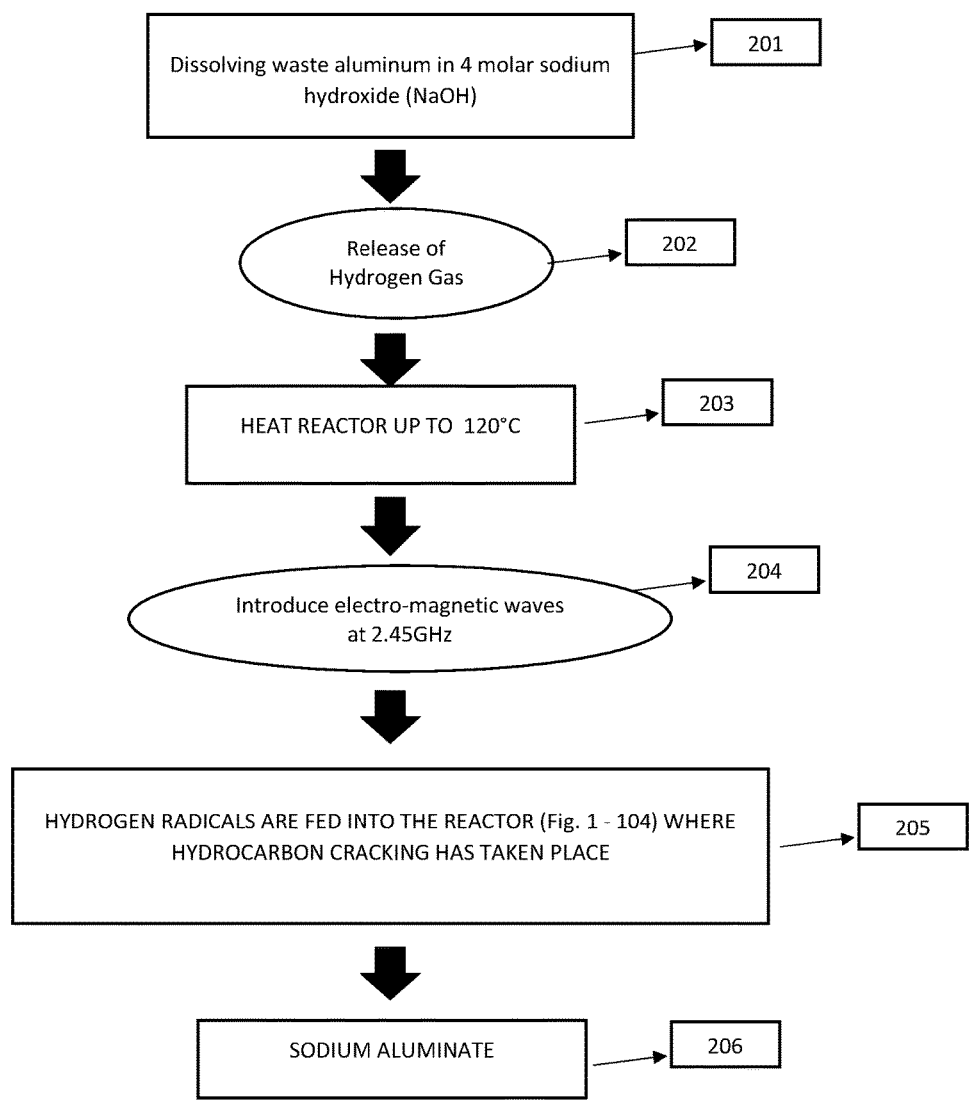

ENGINEERED FEED PROCESS IN CATALYTIC CRACKING, SIMULTANEUS RADICALIZATION OF HYDROGEN GAS AIDED BY ELECTROMAGNETIC WAVES TO CONVERT NATURAL AND SYNTHETIC HYDROCARBON WASTE INTO GASOLINE AND GAS OIL

FIELD OF THE INVENTION

The present invention relates to a process of converting hydrocarbon feedstock into gasoline and gasoline oil under low pressure and low temperature conditions utilizing hydrogen radicals. More specifically, the present disclosure provides a more efficient and cleaner process of converting hydrocarbon waste into useful end products such as gasoline and gasoline gas.

BACKGROUND OF THE INVENTION

Recycling and disposal of hydrocarbon waste continues to be a concern as current disposal methods are costly and harmful to the environment. New methods of waste processing are necessary for hydrocarbon wastes such that steep financial impact to companies and environmental impacts are minimalized if not completely avoided. Hydrocarbon waste includes municipal solid waste, industrial waste, liquids, soils and sludges contaminated by a wide range of hydrocarbon contaminants, such as lubricating oils, bunker and diesel fuels, lighter fractions such as petrol, monocyclic aromatic hydrocarbons, jet fuel, and polycyclic aromatic hydrocarbons. The current major methods of disposing hydrocarbon waste are landfills, incinerators, and pyrolysis.

Sanitary landfills are carefully selected sites where hydrocarbon waste is buried underground. The landfills are prepared by sealing the bottom of the landfill with impermeable synthetic bottom liners to prevent pollution of groundwater. The landfills are filled with waste and further capped with a layer of clay or synthetic liner to prevent water from entering. The use of sanitary landfills to dispose of hydrocarbon waste despite the precautionary layering causes pollution and results in emission of methane and other greenhouse gases into the atmosphere and pollution of underground water if the integrity of the protective membrane is compromised.

Incineration is a waste treatment process that involves the burning of substances contained in waste material until the waste is turned into ash, flue gas and heat. A major output from the incinerators referred to as flue gas that is released into the air may contain particulate matter, heavy metal, dioxins, furans, sulfur dioxide and hydrochloric acid. Further, ash another major byproduct of incineration, has minimal industrial and commercial use. As technology evolves, new uses for ash are emerging including use in concrete or bitumen mixing, however the ash must be processed into "clean" ash prior to use increasing cost.

Pyrolysis is a common technique used to convert hydrocarbon waste into energy. Pyrolysis is the thermal degradation of usually plastic waste at various temperatures ranging from (300-900° C.), in the absence of oxygen producing liquid oil as a biproduct.

The drawback of pyrolysis is the high operational and investment cost and that during pyrolysis the residual sulfur reacts with liquid hydrocarbons and produces sulfuric hydrocarbons such as thiols or mercaptans which need to be re-processed for sulfur removal. Further, the produced ashes contain heavy metal content which needs to be properly disposed or further processed.

The production of hydrogen gas can be achieved by pyrolysis or heating of methane gas. Pyrolysis a process by which methane gas is heated resulting in the productions of hydrogen gas and carbon molecules which in turn react with oxygen to produce carbon dioxide. This process requires a constant flow of methane gas, to be heated to ultimately produce hydrogen gas. The production of hydrogen gas via pyrolysis of methane gas, is costly and more hazardous as it requires high temperatures and a constant supply of methane gas.

SUMMARY OF THE DISCLOSURE

The present invention redesigns and provides a process for producing 45% petroleum coke oil, 45% liquid hydrocarbons such as gasoline and gasoline oil and 10% gases including methane, ethane and propane gases from hydrocarbon waste. The present invention's process consists of a more effective and efficient method of producing useful end products.

The invention involves the burning of hydrocarbon waste including both municipal and industrial waste in a reactor at temperatures starting at 120° C. to 550° C. to generate useful byproducts. The first step of the invention is placement of hydrocarbon waste in a reactor followed by the injection of nitrogen gas into the reactor to neutralize and remove moisture and oxygen from the reactor. Once moisture and oxygen are removed from the reactor, the reactor is gradually heated up to 550° C. to allow the long chains of hydrocarbon to disassociate into smaller hydrocarbon chains. The reactor is heated slowly to allow the breakdown of various hydrocarbons starting with less complex hydrocarbons at 120° C. and up to 550° C. for more complex hydrocarbons. As the bonds of the molecules break during the heating process, radical hydrogen gas is introduced into the reactor. The radical hydrogen gas reacts with released sulfur to create hydrogen sulfide ($H_2S$) and react with the disassociated hydrocarbons in a process of hydrocarbon sealing and result in shorter hydrocarbons.

In the present invention the radical hydrogen atoms used in hydrocarbon sealing are produced by dissolving aluminum scraps in preferably 4 M (molar) sodium hydroxide (NaOH) liquid at 1 atm (atmospheric pressure). The reaction between the aluminum scraps and the sodium hydroxide is exothermic thus requires no addition of heat or catalyst to move the reaction along. Further, the reaction can take place at any concentration of NaOH however, the highest dissolution efficiency is generally at 4M. The exothermic nature of the reaction is more cost effective as no additional heat, pressure or chemicals are necessary making the process safe since hazardous conditions associated with high heat and pressure are not present.

As the aluminum scraps dissolve in the aqueous sodium hydroxide, hydrogen gas is produced. To break the bonds of the hydrogen gas molecules ($H_2$) into hydrogen gas radicals, the hydrogen gas is heated to 100° C.-120° C. in the presence of ultra-magnetic waves that aid in the radicalization of hydrogen gas and maintain the hydrogen radicals in a radicalized state for longer. The aluminum in this process is converted to sodium aluminate which is used as a source of aluminum hydroxide for many industrial processes and has many technical applications.

The result of the hydrocarbon processing is the production of 45% petroleum coke oil, 45% liquid consisting of gasoline and gasoline oil and 10% gases.

A person skilled in the art would readily appreciate that the present disclosure may be a basis for modifying or designing other structures for carrying out the same purposes of the present disclosure. Such equivalent constructions do not depart from the teachings of the disclosure as set forth in the present specification, drawings and claims. The novel features, which are believed to be characteristic of the disclosure, both as to its organization and method of operation, together with further purposes and advantages, will be better understood from the following description when considered in connection with the figures provided herein.

BRIEF DESCRIPTION OF THE DRAWINGS

A person skilled in the art would appreciate that these figures are provided for the purposes of illustration and description only and are not intended to act as limits of the present disclosure.

FIG. 1 is a flowchart according to an exemplary embodiment of the present disclosure demonstrating the process by which waste is processed.

FIG. 2 is a flowchart according to an exemplary embodiment of the present disclosure demonstrating the making of hydrogen radical gas.

DETAILED DESCRIPTION OF THE PREFERRED EMBODIMENTS

The following description is not to be interpreted or applied in a limiting sense, but as an illustration of the general principles and aspects of the invention. The breadth and scope of the present inventions are set forth by the claims. Various inventive features are described below that can each be used independently of one another or in combination with other disclosed and undisclosed features.

FIG. 1, illustrates an exemplary process of turning hydrocarbon waste (100) into 45% petroleum coke oil (106), 45% liquid consisting of gasoline and gasoil (107), and 10% gases (108). Hydrocarbon waste including municipal and industrial waste, is placed into a reactor (100). To remove excess moisture and oxygen from the reactor, nitrogen gas is pumped into the reactor (101) to remove moisture and oxygen. Nitrogen at room temperatures and atmospheric pressure is an inert gas, thus any of noble gas can be interchanged with nitrogen, such as helium, neon, argon, krypton, xenon, radon and oganesson and any gas that is inert under the present conditions. Following the neutralization process by nitrogen (101) the reactor is then heated gradually up to at least 550° C. (102) in an oxygen and water devoid environment. The breakdown of hydrocarbons begins at 120° C. for less complex hydrocarbons and continues until 550° C. for more complex hydrocarbons. The reactor is covered with a ceramic jacket to evenly distribute heat around the reactor. As the temperature rises in the reactor the "cracking" process takes place breaking long hydrocarbon chains into smaller hydrocarbon chains (103). As the cracking process begins at 120° C. and continues to 550° C., hydrogen gas radicals are pumped into the reactor (104) where hydrogen radicals react with the "broken" hydrocarbons in a process called hydrocarbon sealing which occurs starting at 120° C. and up to 550° C. (105(1)) to create shorter hydrocarbon chains and react with free sulfur to create Hydrogen Sulfide ($H_2S$) (105(2)) a gas removing sulfur and preventing sulfur from bonding with the hydrocarbon chains.

The heating of hydrocarbon waste in the presence of hydrogen gas radicals results in 45% Petroleum Coke oil (106), 45% liquid hydrocarbons including gasoline and gas oil (107) and 10% gases (108). Petroleum Coke oil (106) can be burned in a conventional coal fired power station. High grade petroleum coke which is low in sulfur and heavy metals can be used to make electrodes for the steel and aluminum industry. The produced liquid hydrocarbons such as gasoline oil and gas oil can be used as a source of energy and fuel.

FIG. 2, demonstrates an exemplary process of making hydrogen gas radicals at low temperatures and atmospheric pressure with the aid of electromagnetic waves. Aluminum scraps are placed in liquid sodium hydroxide (201) usually in a reactor and as aluminum dissolves in the sodium hydroxide solution hydrogen gas is emitted (202). The preferable concentration of sodium hydroxide is 4 M with the highest noted dissolution efficiency, however, regardless of the concentration of NaOH the reaction moves forward at various concentrations with varying efficiencies. The reaction between aluminum and sodium hydroxide (201) is exothermic and does not require the addition of heat or a catalyst to move the reaction forward.

To convert hydrogen gas into radicalized hydrogen gas, the chamber or reactor is heated up to 100° C.-120° C. (203) and exposed to ultraviolet light around 2.45 GHz (204). The wavelength of the ultraviolet light is subject to change and proportional to the dimensions and design of the reactor, the material of the reactor, the volume of hydrogen gas, the flow rate of the hydrogen gas and if there are possible wave interferences. The exposure of Hydrogen molecules to ultraviolet light catalyzes the radicalization process and further maintains the hydrogen radical atoms in a radicalized state for a longer period of time. As the radicalized hydrogen atoms are produced (205) the hydrogen gas radicals are fed into the reactor (104) where hydrocarbon cracking is taking place. This simultaneous process occurs generally for over 6 hours until all the hydrocarbon waste has been processed.

The byproduct of dissolving aluminum scraps in sodium hydroxide, is sodium aluminate (206). Sodium Aluminate is a white powdery product and is used as a source of aluminum across industries.

A person of skill in the art of the present invention would appreciate that this devise is superior to other methods of hydrocarbon waste disposal. The main advantages of this invention among others are that, first, the process recycles both aluminum waste and hydrocarbon waste into useful final products and second, the process of both hydrogen radical gas formation and recycling of hydrocarbon waste occurs almost entirely at atmospheric pressure (1 atm) and low temperatures making this process easier, safer and more cost effective.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:
1. A process of producing hydrogen gas radicals comprising:
   dissolving aluminum scraps in a sodium hydroxide solution into an aqueous mixture within a reactor;

heating the sodium hydroxide and aluminum mixture up to 120° C. during which hydrogen gas is released into the reactor;

the application of electromagnetic waves into the reactor for radicalizing the hydrogen gas into hydrogen radicals and for the purpose of stabilizing the hydrogen radicals.

2. The process of claim 1, wherein the concentration of sodium hydroxide is 4 M.

3. The process of claim 1, wherein the wavelength of the electromagnetic waves is 2.45 GHz for the radicalization process of hydrogen gas and stabilization of hydrogen radicals.

* * * * *

UNITED STATES PATENT AND TRADEMARK OFFICE
CERTIFICATE OF CORRECTION

PATENT NO. : 11,680,212 B2
APPLICATION NO. : 17/512262
DATED : June 20, 2023
INVENTOR(S) : Seyed Ramin Habibi et al.

It is certified that error appears in the above-identified patent and that said Letters Patent is hereby corrected as shown below:

On the Title Page

Item (72) remove Saeid Shahsavari and Davoud Shahsavari as inventors and add Maryam Moodi, Tustin, CA (US)

Signed and Sealed this
Fifteenth Day of October, 2024

Katherine Kelly Vidal
*Director of the United States Patent and Trademark Office*